United States Patent [19]

Beni et al.

[11] Patent Number: 5,388,582

[45] Date of Patent: Feb. 14, 1995

[54] DATA INTERPOLATION PROCESSING APPARATUS

[75] Inventors: Yoshiro Beni; Yoshitaka Abe; Keiichi Murakami, all of Kawasaki, Japan

[73] Assignee: Fujitsu Limited, Kawasaki, Japan

[21] Appl. No.: 123,078

[22] Filed: Sep. 20, 1993

[30] Foreign Application Priority Data

Oct. 14, 1992 [JP] Japan .................................. 4-276288

[51] Int. Cl.$^6$ .............................................. A61B 8/00
[52] U.S. Cl. ............................. 128/660.07; 73/861.25
[58] Field of Search ................... 128/660.07, 660.05, 128/661.01, 661.09; 73/861.25

[56] References Cited

U.S. PATENT DOCUMENTS

| | | | |
|---|---|---|---|
| 4,368,643 | 1/1983 | Tachita et al. | 128/661.01 |
| 4,930,514 | 6/1990 | Baba et al. | 128/661.09 |
| 5,083,566 | 1/1992 | Baba | 128/660.05 |

Primary Examiner—George Manuel
Attorney, Agent, or Firm—Staas & Halsey

[57] ABSTRACT

A data interpolation processing apparatus used in an ultrasonic diagnostic system and having an interpolation arithmetic unit for obtaining indication data related to a point of interest using a total of eight sampling data. The eight sampling data are located on a total of four scanning lines which include two scanning lines placed on each of opposite sides of the point of interest in the scanning direction, and which include two sampling data on each of the four scanning lines, wherein each of the two sampling data are placed on the opposite sides of a line extending in the scanning direction and passing through the point of interest.

9 Claims, 7 Drawing Sheets

DATA INTERPOLATION PROCESSING APPARATUS

BACKGROUND OF THE INVENTION

1. Field of the Invention

The present invention relates to a data interpolation processing apparatus incorporated into an ultrasonic diagnostic system.

2. Related Background Art

An ultrasonic diagnostic system has been used in which, upon bringing an ultrasonic transducer into contact with a subject, particularly the surface of the human body to be inspected, ultrasonic beams are emitted into the human body, wherein the ultrasounds reflected by tissue in the human body are received by the ultrasonic transducer while the inside of the human body is scanned with the ultrasonic beams, and a tomographic image of the interior of the human body is displayed on the basis of the received signals, thereby facilitating diagnosis of diseases of the viscera and the like of the human body.

As a scheme of scanning the subject with the ultrasonic beams, there are known, for example, a sector scanning scheme in which a great number of ultrasonic beams (scanning lines) fan out, a linear scanning scheme in which scanning lines extend in parallel with each other, and a convex scanning scheme using a probe in which ultrasonic transducers are arranged in a convex-like configuration.

The thus obtained received signals are subjected to a sampling process and also an A/D conversion so as to be converted into digital sampling data. However, generally, positions of the respective pixels represented by such digital sampling data do not correspond to positions of the respective pixels on a display screen of a CRT display device, for example, on which a tomographic image is displayed. Consequently, it is necessary to perform a data interpolation processing so as to generate indication data related to a coordinate system suitable for display.

Figure 7:
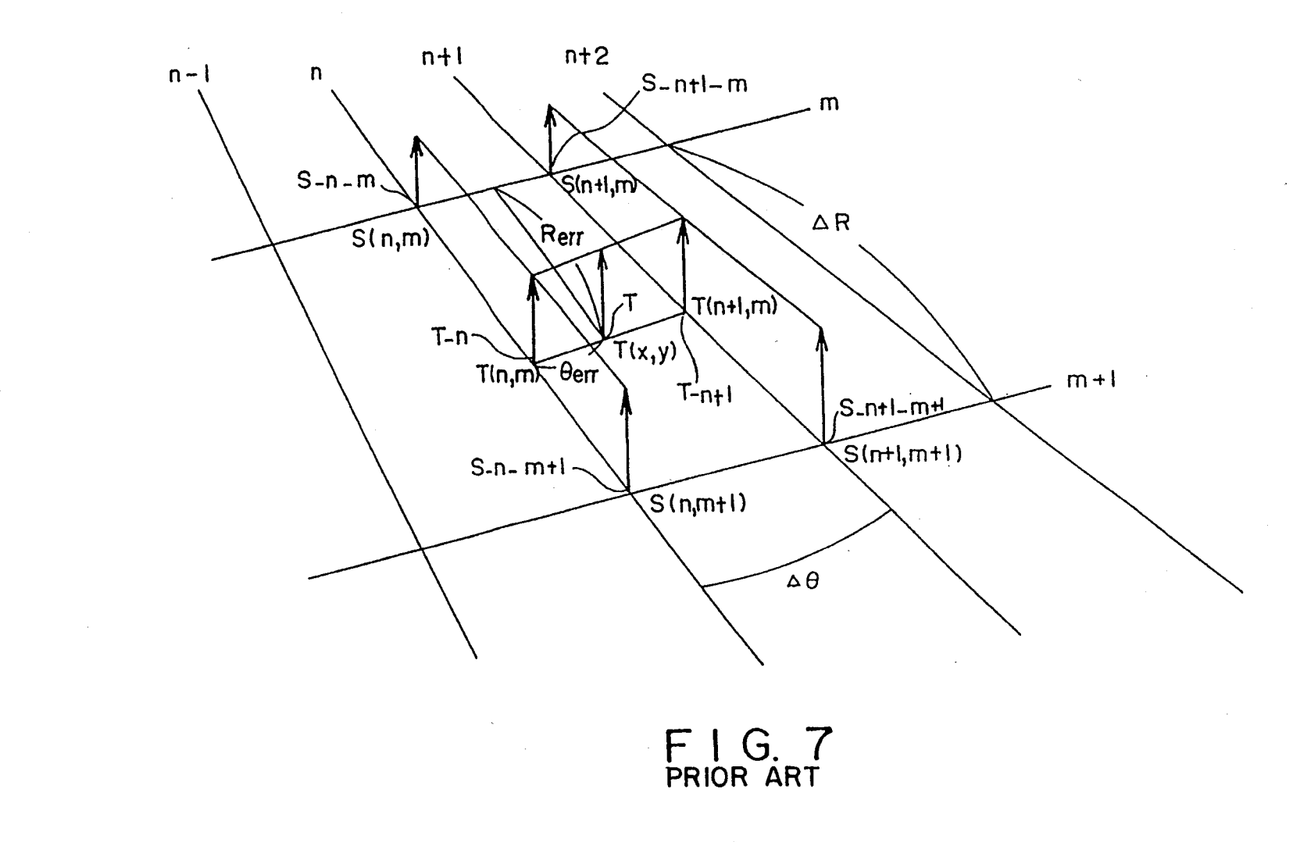
FIG. 7 is a view useful for understanding the arithmetic operation of data interpolation processing according to the prior art.

FIG. 7 is a view useful for understanding the conventional data interpolation processing operation.

The straight lines extending from the upper left of the figure to the lower right denote scanning lines n−1, n, n+1, n+2, . . . , respectively. On the other hand, the straight lines extending horizontally denote lines m, m+1, . . . , respectively, each spaced apart in a scanning direction and representing an arrangement of sampling data involved in the same depth of the subject.

The sampling data correspond to the associated cross points of the scanning lines n−1, n, n+1, n+2, . . . , and the lines m, m+1, . . . , respectively. Specifically, to obtain indication data at the point T, the sampling data S(n, m), S(n, m+1), S(n+1, m) and S(n+1, m+1) are used at the adjacent four points S_n_m, S_n m+1, S_n+1_m, and S_n+1_m+1, respectively. Now, as shown in FIG. 7, it is assumed that ΔR denotes a distance between the line m and the line m+1; $R_{err}$ denotes a distance between the line m and the point T; Δθ denotes a distance between the scanning lines n and n+1; and $\theta_{err}$ denotes a distance between the scanning line n and the point T.

First, in accordance with the following equation (1), the interpolation data T (n, m) at the point T_n is obtained by means of implementing a linear interpolation processing using sampling data S(n, m) and S(n, m+1) at the two points S_n_m, and S_n_m+1, respectively, while the interpolation data T (n+1, m) at the point T−n+1 is obtained by means of implementing a linear interpolation processing using sampling data S(n+1, m+1) and S(n+1, m+1) at two points S_n+1_m, and S_n+1_m+1, respectively.

$$T(k,m) = \frac{R_{err}}{\Delta R} S(k,m+1) + \left(1 - \frac{R_{err}}{\Delta R}\right) S(k,m) \quad (1)$$

where k=n, n+1

Next, the indication data T (x, y) corresponding to the point T is obtained by means of implementing a linear interpolation processing based on the following equation (2) using the two pieces of interpolation data T (n, m) and T (n+1, m) obtained through the equation (1).

$$T(x,y) = \frac{\theta_{err}}{\Delta \theta} T(n,m+1) + \left(1 - \frac{\theta_{err}}{\Delta \theta}\right) T(n,m) \quad (2)$$

The implementation of such an interpolation processing for the tomographic image in its entirety makes up a tomographic image adapted for display.

The interpolation processing scheme as mentioned above is called a bi-linear interpolation, and is well known.

According to the conventional interpolation processing scheme, however, it may happen that high luminance lines appear on the ultrasonic scanning lines, so that these artifacts are displayed in the form of a virtual image. Specifically, a recent ultrasonic diagnostic system is provided with a magnifying function for a displayed image. In the tomographic image obtained by the sector scanning scheme and the convex scanning, the scanning line density will become lower as the depth of the subject is greater, since the scanning lines substantially fan out. In this condition, if the linear interpolation processing is implemented, there will appear peaks of data on the scanning lines. As a result, it will cause the following drawback. That is, it may happen that the high luminance lines appear on the ultrasonic scanning lines. This high luminance line often appears when the linear interpolation is carried out with a larger value of ultrasonic sampling data.

SUMMARY OF THE INVENTION

In view of the foregoing, it is therefore an object of the present invention to provide a data interpolation processing apparatus for performing a data interpolation processing such that lines hardly appear in form of a virtual image.

A data interpolation processing apparatus according to the present invention, which can attain the above object, is incorporated into an ultrasonic diagnostic system wherein while an inside of a subject is scanned with ultrasonic beams forming scanning lines in a predetermined scanning direction. Ultrasounds reflected by the inside of the subject are received and subjected to a sampling process so as to obtain sampling data, and the thus obtained sampling data are subjected to an interpolation processing to calculate indication data, wherein the data interpolation processing apparatus comprises an interpolation arithmetic means for obtaining the indication data related to a point of interest using a total of eight sampling data which are located on a total of four scanning lines comprising two scanning lines placed on the respective opposite sides of the point of interest in the scanning direction, and which comprise of two sampling data on each of the four scanning lines selected in such a way that the respective two sampling data are placed on the opposite sides of an extended line on the point of interest in the scanning direction.

Figure 1A:
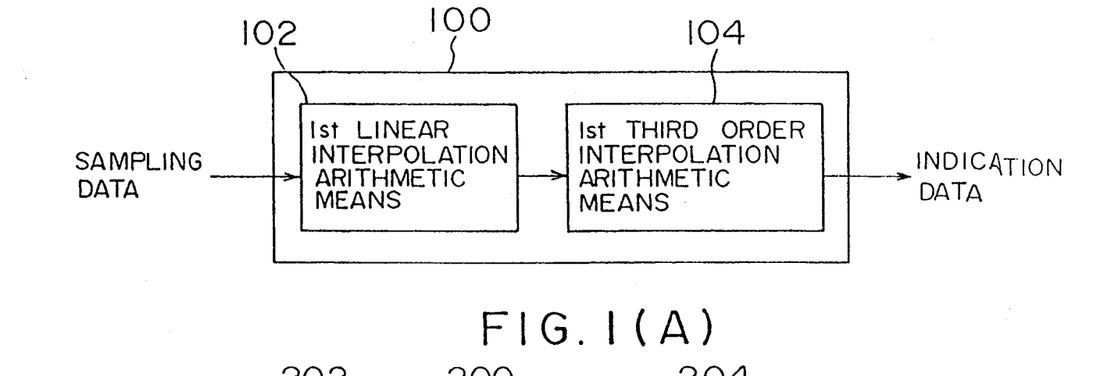
FIGS. 1(A) and 1(B) are block diagrams showing the arrangement of a data interpolation processing apparatus according to the present invention.
Figure 1B:
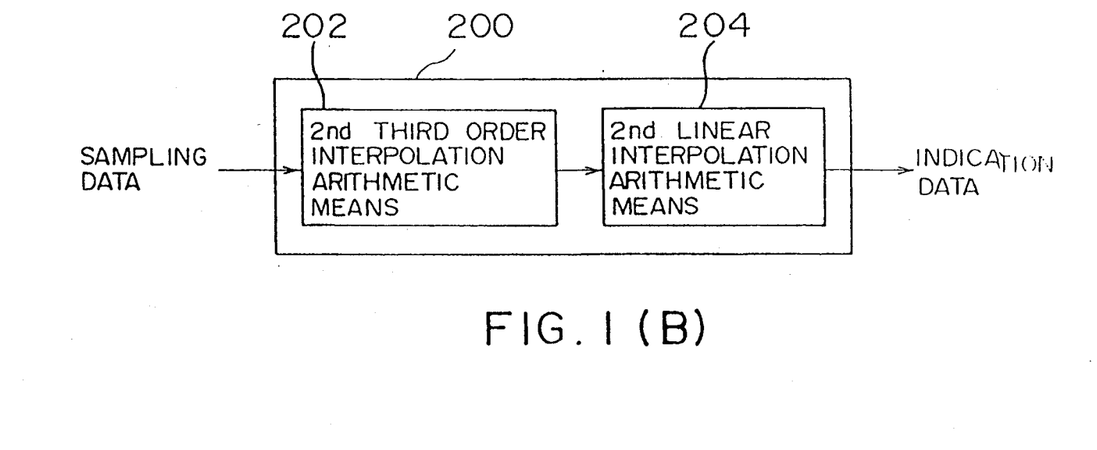

FIGS. 1(A) and 1(B) are block diagrams showing the arrangement of a data interpolation processing apparatus according to the present invention. Referring to FIGS. 1(A) and 1(B), the present invention will be described in detail hereinafter.

FIG. 1(A) is representative of a first aspect of a data interpolation processing apparatus according to the present invention. In FIG. 1(A), an interpolation arithmetic means 100 comprises first linear interpolation arithmetic means 102 and first third order interpolation arithmetic means 104.

Sampling data are applied to the interpolation arithmetic means 100. This input sampling data enter the first linear interpolation arithmetic means 102 which is adapted for performing a linear interpolation processing for the respective two sampling data lined up on each of four scanning lines, the four scanning lines comprising two scanning lines placed on respective opposite sides of a point of interest in a scanning direction. As a result, a total of four interpolation data, each of which is on a respective one of the four scanning lines, are obtained and correspond to the point of interest.

The thus obtained four linear interpolation data are input to first third order interpolation arithmetic means 104 for performing a third order interpolation processing for the respective four linear interpolation data obtained by the first linear interpolation arithmetic means 102 to obtain the indication data involved in the point of interest.

FIG. 1(B) is representative of a second aspect of a data interpolation processing apparatus according to the present invention. In FIG. 1(B), an interpolation arithmetic means 200 comprises second third order interpolation arithmetic means 202 and second linear interpolation arithmetic means 204.

Sampling data applied to the interpolation arithmetic means 200 enter the second third order interpolation arithmetic means 202 adapted for performing a third order interpolation processing for sampling data lined up in two rows each comprising four sampling data in the scanning direction to obtain a piece of third order interpolation data on each row for a total of two pieces of third order interpolation data.

The thus obtained two pieces of third order interpolation data are passed to second linear interpolation arithmetic means 204 adapted for performing a linear interpolation processing for the respective two pieces of third order interpolation data obtained by the second third order interpolation arithmetic means 202 to obtain the indication data involved in the point of interest.

Incidentally, while the above description concerns the interpolation arithmetic processing on a particular one point of interest, indeed, such interpolation arithmetic processing is implemented over a great number of points on an image.

Generally, according to the ultrasonic diagnostic system, it is possible to expect a sufficient resolution with respect to a depth direction in which a scanning line is extended, but the resolution is poor with respect to a scanning direction. Hence, large errors due to the interpolation would appear with respect to the scanning direction. In view of the foregoing, the data interpolation processing apparatus according to the present invention is provided with an interpolation arithmetic unit for performing an interpolation arithmetic processing using sampling data involved in a total of eight points comprising four points in the scanning direction for each of two different depths, to obtain indication data involved in a desired point or the aimed point. In such an interpolation arithmetic unit, a linear interpolation is performed with respect to the depth direction, while a third order interpolation is performed with respect to the scanning direction.

According to the first aspect as shown in FIG. 1(A), the first linear interpolation arithmetic means 102 is used to perform a linear interpolation processing in the depth direction, and the first third order interpolation arithmetic means 104 is used to practice a third order interpolation processing. Thus, it is possible to obtain indication data involved in the point of interest or the aimed point with greater accuracy as compared with that of a conventional one. In an image formed on the basis of the thus obtained indication data, a virtual image hardly appears.

According to the second aspect as shown in FIG. 1(B), the second third order interpolation arithmetic means 202 is first used to perform third order interpolation processing in the scanning direction, and then the second linear interpolation arithmetic means 204 is used to perform a linear interpolation processing in the depth direction. Thus, it is possible, similar to the first aspect, to obtain indication data involved in the point of interest with greater accuracy.

As described above, the data interpolation processing apparatus according to the present invention is provided with an interpolation arithmetic unit for performing an interpolation arithmetic processing using sampling data involved in a total of eight points comprising two points in the depth direction on each of four different scanning lines in the scanning direction, to obtain indication data related to a point of interest. Consequently, according to the present invention, it is possible to reduce or eliminate high luminance of virtual images which would appear when the conventional bi-linear interpolation processing is carried out. In addition, it is possible to obtain the smoothness of interpolation images even when images are enlarged.

The objects and features of the present invention will become more apparent from the consideration of the following detailed description taken in conjunction with the accompanying drawings.

DESCRIPTION OF THE PREFERRED EMBODIMENTS

Preferred embodiments of the present invention will be described in detail with reference to the accompanying drawings.

Figure 2:
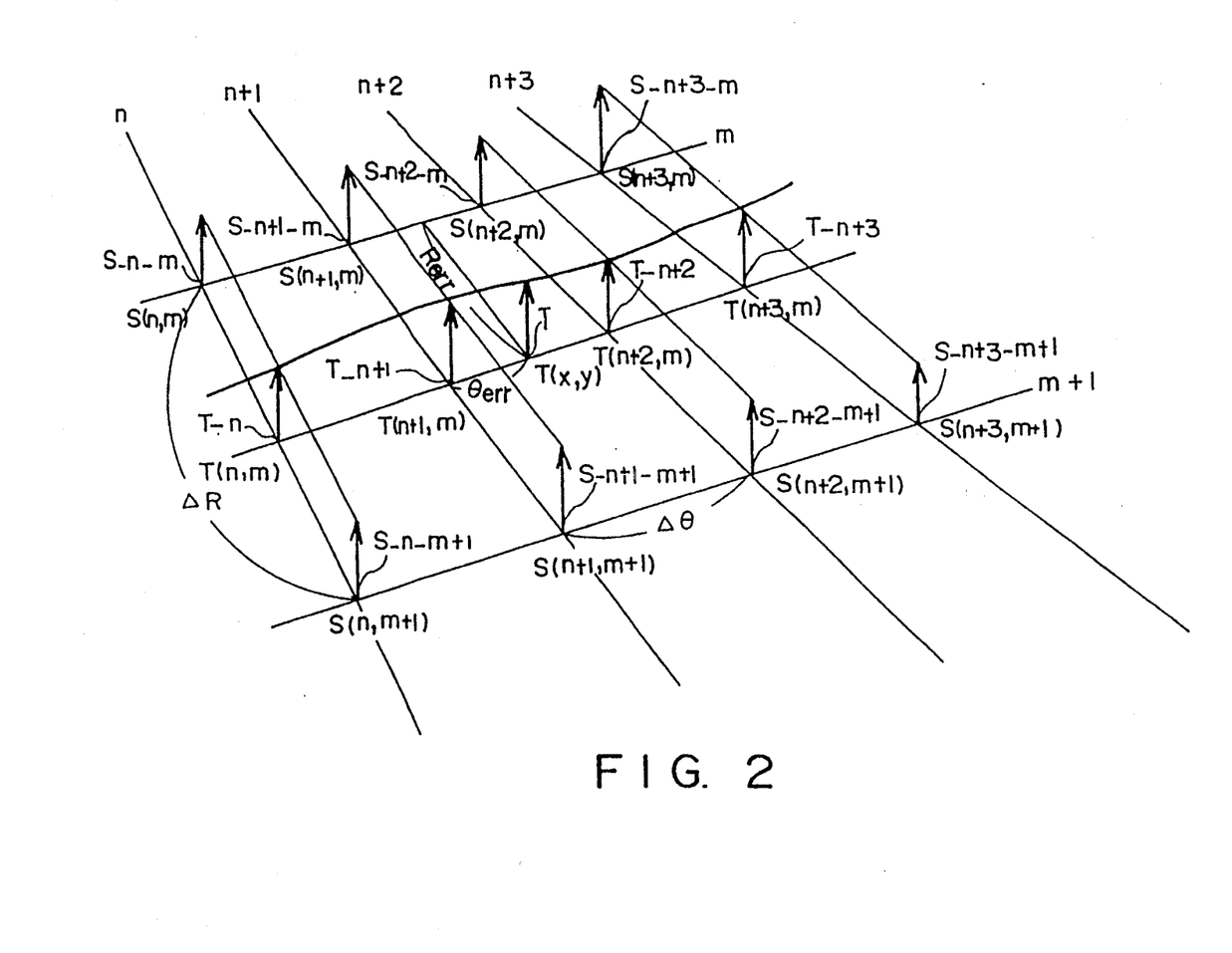
FIG. 2 is a view useful for understanding the arithmetic operation of data interpolation processing according to the present invention.

FIG. 2 is a view useful for understanding the arithmetic operation of data interpolation processing according to the present invention. In FIG. 2, the reference symbol marks are denoted on the same basis as in FIG. 7.

Specifically, to obtain the indication data T (x, y) involved in the point T of interest, first, the linear interpolation processing is performed in a depth direction with respect to ultrasonic scanning lines, using a total of eight sampling data S (n, m), S (n, m+1), S (n+1, m), S (n+1, m+1), S (n+2, m), S,(n+2, m+1), S (n+3, m), S (n+3, m+1) associated with a total of eight points S_n_m, S_n_m+1, S_n+1_m, S_n+1_m+1, S_n+2_m, S_n+2_m+1, S_n+3_m, S_n+3_m+1, respectively, which are located on a total of four scanning lines n, n+1, n+2 and n+3, comprising two scanning lines placed on each of the opposite sides of the point T of interest in the scanning direction, and which sampling data comprises two sampling data on each of the four scanning lines selected in such a way that each of the two sampling data on the same scanning line are placed (on lines m and m+1) on the respective opposite sides of an extended line on the point of interest in the scanning direction. This linear interpolation processing is implemented through calculation of the following equation (3) so as to obtain linear interpolation data T (n, m), T (n+1, m), T (n+2, m) and T (n+3, m) on the associated four points T_n, T_n+1, T_n+2 and T_n+3, respectively. This interpolation processing is the same as the conventional one.

$$T(k,m) = \frac{R_{err}}{\Delta R} S(k, m + 1) + \left(1 - \frac{R_{err}}{\Delta R}\right) S(k,m) \quad (3)$$

where k=n, n+1, n+2, n+3

Next, using those linear interpolation data T (n, m), T (n+1, m), T (n+2, m) and T (n+3, m) on the associated four points T_n, T_n+1, T_n+2 and T_n+3, respectively, the third order interpolation processing is performed. This third order interpolation processing is implemented through calculation of the following equations (4) to (8):

$$T(x,y) = a\left(\frac{\theta_{err}}{\Delta\theta}\right)^3 + b\left(\frac{\theta_{err}}{\Delta\theta}\right)^2 + c\left(\frac{\theta_{err}}{\Delta\theta}\right) + d \quad (4)$$

$$a = \frac{1}{6}(T(n + 3,m) - T(n,m)) + \quad (5)$$

$$\frac{1}{2}(T(n + 1,m) - T(n + 2,m))$$

$$b = \frac{1}{2}(T(n,m) - T(n + 2,m)) - T(n + 1,m) \quad (6)$$

$$c = T(n + 2,m) - \frac{1}{2}T(n + 1,m) - \frac{1}{6}(2T(n,m) - \quad (7)$$

$$T(n + 3,m))$$

$$d = T(n + 1,m) \quad (8)$$

This arithmetic operation is obtained, assuming that the point T_n+1 is given as the original and $\Delta\theta=1$ (unit distance) is given, when the following simultaneous equations (9)–(12) are solved:

$$T(n, m) = (-a) + b - c + d \quad (9)$$

$$T(n+1, m) = d \quad (10)$$

$$T(n+2, m) = a + b + c + d \quad (11)$$

$$T(n+3, m) = 8a + 4b + 2c + d \quad (12)$$

Figure 3:
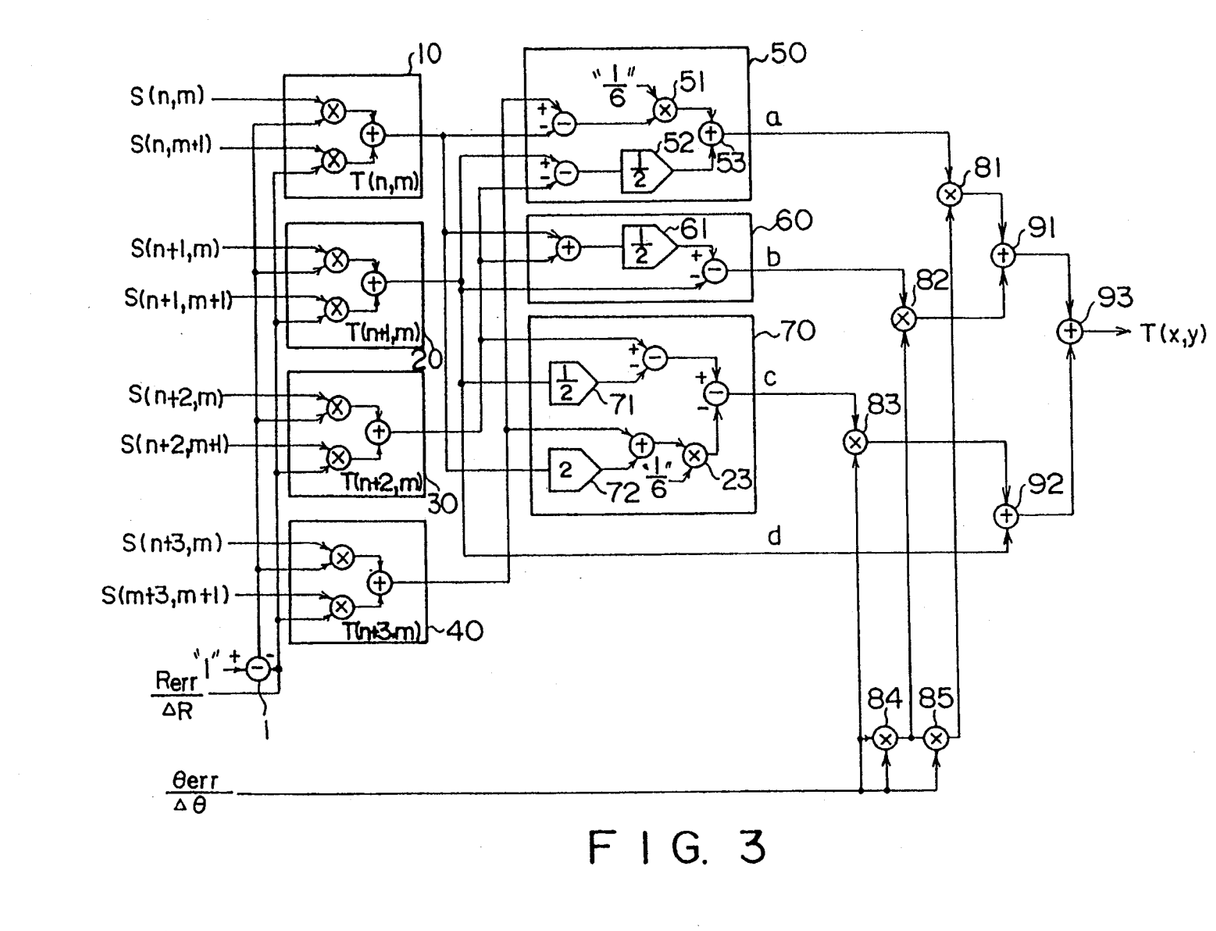
FIG. 3 is a circuit diagram of a data interpolation processing apparatus according to the present invention as one illustrative embodiment in the form of the first aspect.

FIG. 3 is a circuit diagram of a data interpolation processing apparatus according to the present invention as one illustrative embodiment in the form of the first aspect, in accordance with which apparatus the above arithmetic operation is implemented. In the figure, marks "+", "−" and "×" encircled denote an adder, a subtracter and a multiplier, respectively, and an arrow configuration in a pentagon shape denotes a shifter through which its input signal is shifted to an LSB (Least Significant Bit) side or an MSB (Most Significant Bit) side using a signal conversion such that the input signal is converted into a signal having a value obtained when the input signal is multiplied by a numeral within the pentagon.

Pairs of sampling data S (n, m) and S (n, m+1); S (n+1, m) and S (n+1, m+1); S (n+2, m) and S (n+2, m+1); and S (n+3, m) and S (n+3, m+1) are input to linear interpolation processing units 10, 20, 30 and 40, respectively. Also, the coefficient $R_{err}/\Delta R$ is applied to the respective linear interpolation processing units 10, 20, 30 and 40. Further, the coefficient $R_{err}/\Delta R$ and the additional coefficient "1" are applied to a subtracter 1 in which the operation for "$1-(R_{err}/\Delta R)$" is carried out. An operation result is also supplied to the respective linear interpolation processing units 10, 20, 30 and 40. In the linear interpolation processing units 10, 20, 30 and 40, linear interpolation arithmetic operations are carried out in accordance with the equation (3) where k=n, n+1, n+2, n+3, respectively, so as to obtain the linear interpolation data T (n, m), T (n+1, m), T (n+2, m) and T (n+3, m). According to the embodiment shown in FIG. 3, the combination of the linear interpolation processing units 10, 20, 30 and 40 may be considered by way of example of the first linear interpolation arithmetic means 102 (FIG. 1) according to the present invention.

Next, the third order interpolation processing is performed using the thus obtained linear interpolation data T (n, m), T (n+1, m), T (n+2, m) and T (n+3, m). In a factor arithmetic unit 50 for calculating the equation (5), a factor "a" is obtained. A multiplier 51 is for multiplying an input data by 1/6. A shifter 52 serves to multiply an input data by ½ by means of shifting the input data by one bit to an LSB side, which input data is passed to an adder 53. The use of such a shifter 52 permits the input data to be multiplied by ½ without using a multiplier. On a similar basis, in a factor arithmetic unit 60 for obtaining a factor "b", a shifter 61 serves to multiply an input data by ½ by means of shifting the input data by one bit to an LSB side, which input data is passed to a subtracter. In a factor arithmetic unit 70 for obtaining a factor "c", a shifter 71 is used for multiplying an input data by ½ and a shifter 72 is used for multiplying an input data by 2, by means of bit-shifting the input data to an LSB side and an MSB side, respectively. With respect to a factor "d", as apparent from the equation (10), the linear interpolation data T (n+1, m) is used as it is.

After the respective factors a, b, c and d are obtained, $a \times (\theta_{err}/\Delta\theta)^3$ is calculated by a multiplier 81; $b \times (\theta_{err}/\Delta\theta)^2$ by a multiplier 82; and $c \times (\theta_{err}/\Delta\theta)$ by a multiplier 83. Those calculation results are added using adders 91, 92 and 93. Incidentally, $(\theta_{err}/\Delta\theta)^2$ is calculated by a multiplier 84, and $(\theta_{err}/\Delta\theta)^3$ is calculated by a multiplier 85.

According to the present embodiment, the calculations for the multiplication by values ½ and 2 are carried out by the shifters for bit-shifting to an LSB side and an MSB side, respectively. It should be noticed, however, that additional independent multipliers can be used for those calculations. Further, it is noted that the calculation for the multiplication by a value 1/6 may be implemented by the combination of the adder and the shifter.

Figure 4:
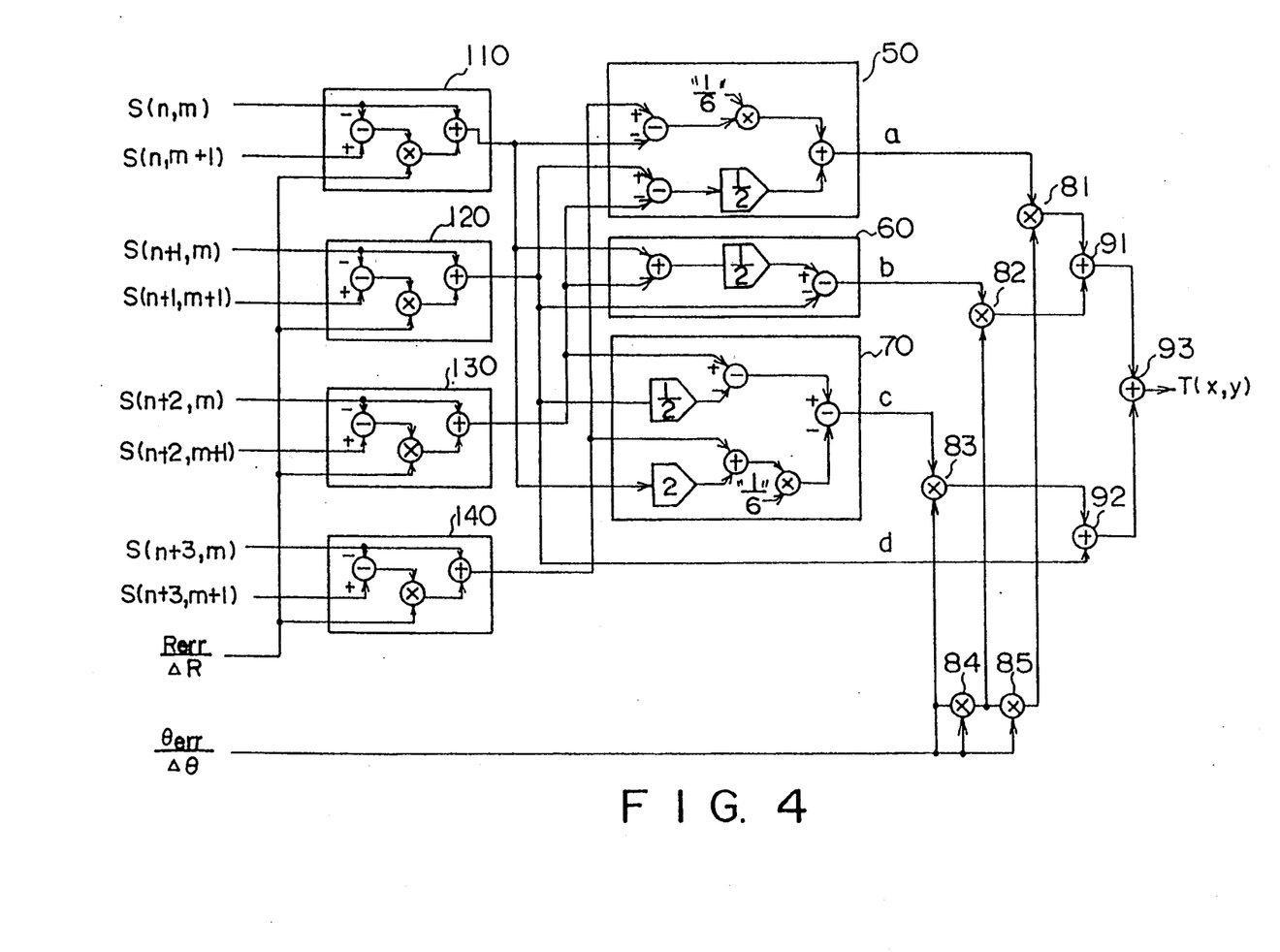
FIG. 4 is a circuit diagram of a data interpolation processing apparatus according to the present invention as another illustrative embodiment in form of the first aspect.

FIG. 4 is a circuit diagram of a data interpolation processing apparatus according to the present invention as another illustrative embodiment in the form of the first aspect.

To rewrite the equation (3), it will be given as follows:

$$T(k,m) = S(k,m) + (S(k,m + 1) - S(k,m)) \frac{R_{err}}{\Delta R} \quad (13)$$

where k=n, n+1, n+2, n+3

According to the embodiment shown in FIG. 4, the linear interpolation processing is performed in accordance with the equation (3), and linear interpolation units 110, 120, 130 and 140 each are realized with a single multiplier. According to the present embodiment, there is no need to perform the operation for "$1-(R_{err}/\Delta R)$" (subtracter 1 in FIG. 3). An arrangement of the third order interpolation processing is the same as that shown in FIG. 3.

Figure 5:
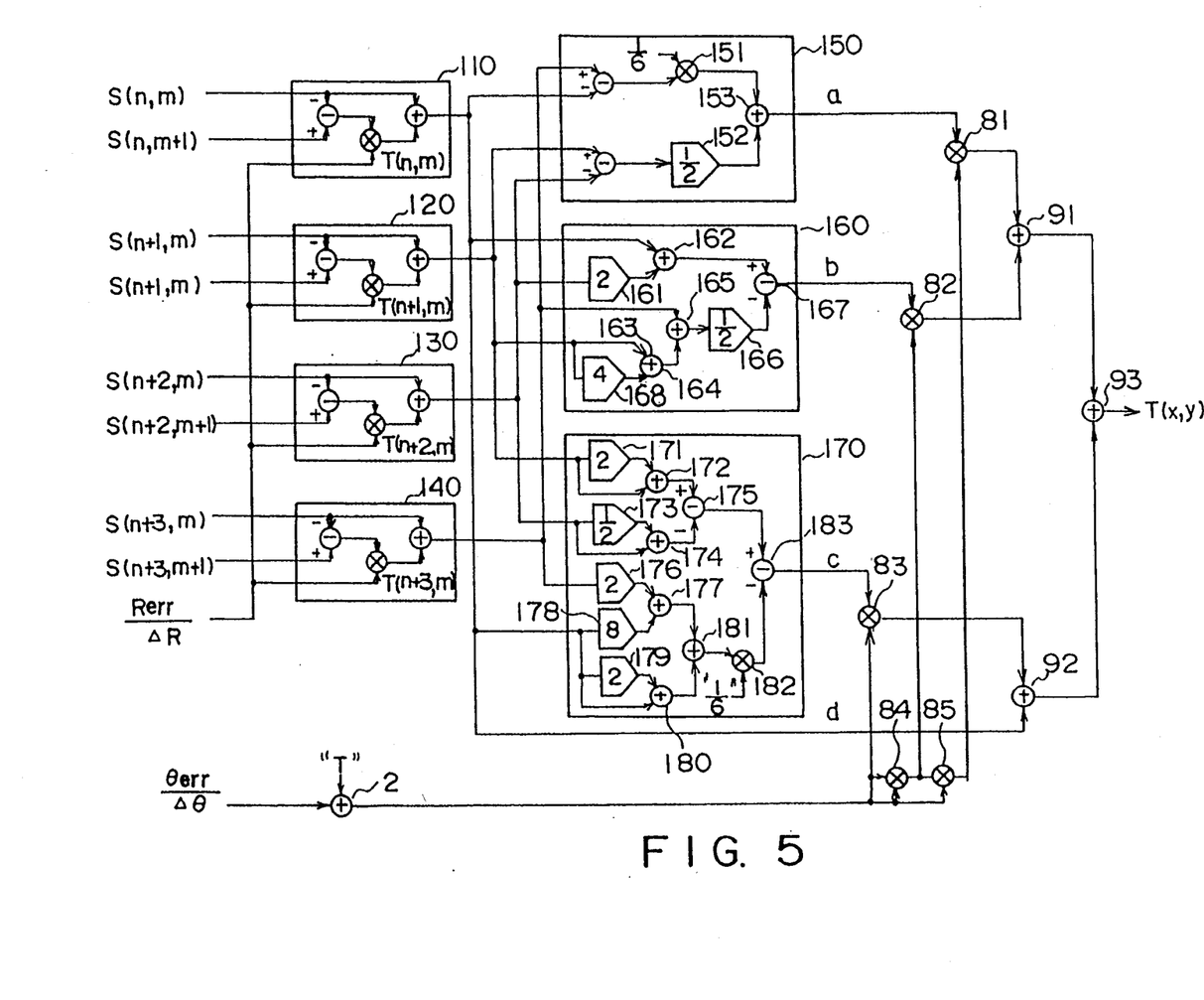
FIG. 5 is a circuit diagram of a data interpolation processing apparatus according to the present invention as a further illustrative embodiment in the form of the first aspect.

FIG. 5 is a circuit diagram of a data interpolation processing apparatus according to the present invention as a further illustrative embodiment in the form of the first aspect.

According to the present embodiment, the third order interpolation processing is implemented through calculation of the following equations (14) to (18):

$$T(x,y) = a\left(\frac{\theta_{err}}{\Delta\theta}\right)^3 + b\left(\frac{\theta_{err}}{\Delta\theta}\right)^2 + c\left(\frac{\theta_{err}}{\Delta\theta}\right) + d \quad (14)$$

$$a = \frac{1}{6}(T(n + 3,m) - T(n,m)) + \quad (15)$$

$$\frac{1}{2}(T(n + 1,m) - T(n + 2,m))$$

$$b = (T(n,m)) + 2T(n + 2,m) - \frac{1}{2}(5T(n + 1,m) + \quad (16)$$

$$T(n + 3,m))$$

$$c = 3T(n + 1,m) - \frac{3}{2}T(n + 2,m) - \quad (17)$$

$$\frac{1}{6}(2T(n + 3,m) + 11T(n,m))$$

$$d = T(n,m) \quad (18)$$

This arithmetic operation is obtained, assuming that the point T_n is given as the original, and $\Delta\theta = 1$ (unit distance) is given, when the following simultaneous equations (19)–(22) are solved:

$$T(n, m) = d \quad (19)$$

$$T(n+1, m) = a+b+c+d \quad (20)$$

$$T(n+2, m) = 8a+4b+2c+d \quad (21)$$

$$T(n+3, m) = 27a+9b+3c+d \quad (22)$$

In a factor arithmetic unit 150 for obtaining a factor "a", a multiplier 151 is for multiplying an input data by 1/6. A shifter 152 serves to multiply an input data by ½ by means of shifting the input data by one bit to an LSB side. The outputs of the multiplier 151 and the shifter 152 are added by an adder 153. On a similar basis, in a factor arithmetic unit 160 for obtaining a factor "b", a shifter 161 serves to multiply an input data by 2 by means of shifting the input data by one bit to an MSB side. In order to obtain a value corresponding to five times as much as an input data, a bit shifter 168 is used to multiply the input data by 4 by means of shifting the input data by 2 bits to an MSB side, and in addition an adder 164 is used to add the input data to the thus obtained value. A shifter 166 is used to multiply an input data by ½ by means of shifting the input data by one bit to an LSB side. In a factor arithmetic unit 170 for obtaining a factor "c", in order to obtain a value corresponding to eleven times as much as an input data, there are used a bit shifter 178 for shifting the input data by 3 bits to an MSB side to multiply the input data by 8, a bit shifter 179 for shifting the input data by 1 bit to an MSB side to multiply the input data by 2, and adders 177, 180 and 181 for addition of an output of the bit shifter 178, an output of the bit shifter 179 and the input data itself. In this manner, according to the present embodiment, it is possible to avoid the use of the multiplier as much as possible, thereby reducing a circuit scale (the number of gates of LSI or the like). Of course, it is also possible to implement the respective operations using the multipliers.

In the embodiment shown in FIG. 5, the linear interpolation units 110, 120, 130 and 140 are the same as those shown in FIG. 4, respectively. It is noted, however, that the linear interpolation units 10, 20, 30 and 40 shown in FIG. 3 may be used instead of those, respectively.

Figure 6:
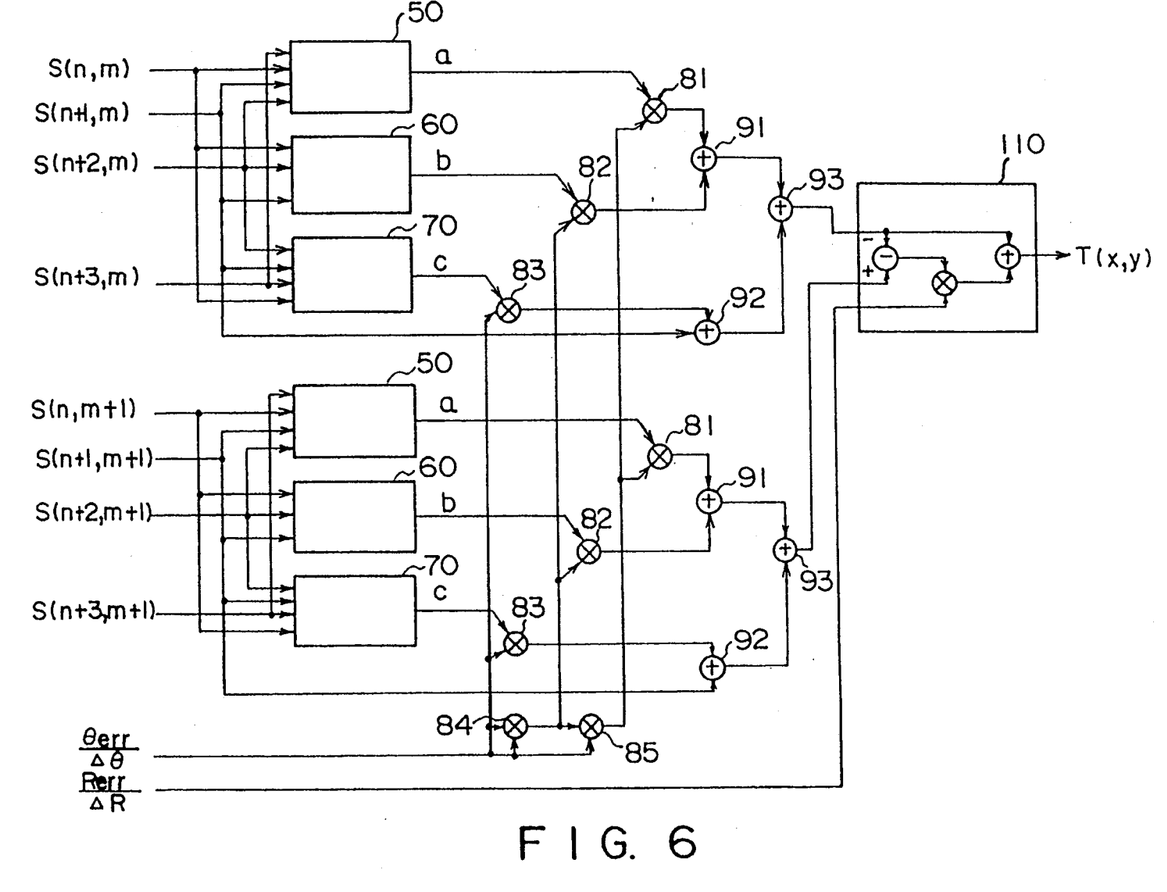
FIG. 6 is a circuit diagram of a data interpolation processing apparatus according to the present invention as one illustrative embodiment in the form of the second aspect.

FIG. 6 is a circuit diagram of a data interpolation processing apparatus according to the present invention as one illustrative embodiment in the form of the second aspect. According to the present embodiment, first, the third order interpolation processing is performed to obtain data involving two points, and then indication data is obtained based on the thus obtained data through the linear interpolation processing. In FIG. 6, factor arithmetic units 50, 60, and 70 for obtaining third order factors a, b and c, respectively, are the same as those shown in FIG. 3, respectively. Further, in FIG. 6, multipliers 81, 82 and 83 and adders 91, 92 and 93 are the same as those shown in FIG. 3. While the linear interpolation unit is the same as any one of the linear interpolation units 110, 120, 130 and 140 shown in FIG. 4, any one of the linear interpolation units 10, 20, 30 and 40, shown in FIG. 3, may be used instead.

What is claimed is:

1. A data interpolation processing apparatus for generating indication data for points of interest related to a coordinate system for display and used in an ultrasonic diagnostic system which is to scan an inside of a subject with ultrasonic beams forming a plurality of scanning lines extending in a depth direction and spaced apart in a predetermined scanning direction, the ultrasonic diagnostic system to receive the ultrasonic beams which are reflected by the inside of the subject, said data interpolation processing apparatus comprising:

means for sampling the reflected ultrasonic beams to produce sampled data; and interpolation arithmetic means for interpolating eight data points of the sampled data to generate the indication data for each point of interest, wherein the eight data points of the sampled data represent pairs of data points located respectively on four scanning lines of said plurality of scanning lines, two of said four scanning lines being placed on each side of said each point of interest in the scanning direction, the data points of each pair of data points being respectively located on each side of said each point of interest in the depth direction.

2. The data interpolation processing apparatus as claimed in claim 1, wherein said interpolation arithmetic means comprises:

linear interpolation means for performing a linear interpolation processing for each pair of data points to respectively determine four pieces of linear interpolation data; and third order interpolation means for performing a third order interpolation processing for the four pieces of linear interpolation data to determine the indication data for said each point of interest.

3. The data interpolation processing apparatus as claimed in claim 2, wherein said linear interpolation means comprises:

first through fourth linear interpolation processing means respectively performing the linear interpolation processing for the pairs of data points, respectively, each of said first through fourth linear interpolation means comprising:

a first multiplier to multiply a first one of a respective pair of data points by a predetermined value, to generate a first multiplied value;

a second multiplier to multiply a second one of the respective pair of data points by $R_{err}/\Delta R$, to generate a second multiplied value, where the eight data points form two imaginary lines extending through four respective ones of the pairs of data points lined up in the scanning direction and $\Delta R$ is a first distance between the two imaginary lines and $R_{err}$ is a second distance between a first of the two imaginary lines, closer to the ultrasonic diagnostic system than said each point of interest, and said each point of interest; and an adder to add the first and second multiplied values, to generate a respective one of the four pieces of linear interpolation data.

4. The data interpolation processing apparatus as claimed in claim 3, wherein said third order interpolation means comprises:

first through third factor arithmetic means, said first and third factor arithmetic means each receiving the four pieces of linear interpolation data and said second order interpolation means receives three of the four pieces of linear interpolation data, wherein said first through third factor arithmetic means determine the indication data for said each point of interest.

5. The data interpolation processing apparatus as claimed in claim 4, each of said first through third factor arithmetic means comprises at least one shifter to shift various ones of the four pieces of linear interpolation data.

6. The data interpolation processing apparatus as claimed in claim 2, wherein said linear interpolation means comprises:

first through fourth linear interpolation processing means respectively performing the linear interpolation processing for the pairs of data points, respectively, each of said first through fourth linear interpolation means comprising:

a subtracter to subtract a first one of a respective pair of data points from a second one of the respective pair of data points, to generate a first subtracted value;

a multiplier to multiply the first subtracted value by $R_{err}/\Delta R$, to generate a multiplied value, where the eight data points form two imaginary lines extending through four respective ones of the pairs of data points lined up in the scanning direction and $\Delta R$ is a first distance between the two imaginary lines and $R_{err}$ is a second distance between a first of the two imaginary lines, closer to the ultrasonic diagnostic system than said each point of interest, and said each point of interest; and an adder to add the multiplied value to the first one of the respective pair of data points, to generate a respective one of the four pieces of linear interpolation data.

7. The data interpolation processing apparatus as claimed in claim 1, wherein said interpolation arithmetic means comprises:

third order interpolation means for performing a third order interpolation processing for two groups each comprising four respective ones of the pairs of data points lined up in the scanning direction, to determine two pieces of third order interpolation data; and linear interpolation means for performing a linear interpolation processing for the two pieces of third order interpolation data, to determine the indication data for said each point of interest.

8. The data interpolation processing apparatus as claimed in claim 7, wherein said third order interpolation means comprises:

first through third order interpolation means each receiving the four pieces of linear interpolation data, wherein said first through third order interpolation means determines the indication data for said each point of interest.

9. The data interpolation processing apparatus as claimed in claim 8, each of said first through third factor arithmetic means comprises at least one shifter to shift various ones of the four pieces of linear interpolation data.

* * * * *